US007424603B2

(12) United States Patent
Brannock et al.

(10) Patent No.: US 7,424,603 B2
(45) Date of Patent: Sep. 9, 2008

(54) METHOD AND APPARATUS TO STORE INITIALIZATION AND CONFIGURATION INFORMATION

(75) Inventors: Kirk D. Brannock, Hillsboro, OR (US); John I. Garney, Portland, OR (US); Richard L. Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 10/742,386

(22) Filed: Dec. 18, 2003

(65) Prior Publication Data

US 2005/0138266 A1 Jun. 23, 2005

(51) Int. Cl.
*G06F 9/445* (2006.01)
*G06F 15/177* (2006.01)

(52) U.S. Cl. .............................. 713/2; 713/1; 713/100

(58) Field of Classification Search ................ 713/1, 713/2, 100; 711/100–173
See application file for complete search history.

(56) References Cited

U.S. PATENT DOCUMENTS

| | | | | |
|---|---|---|---|---|
| 5,187,792 A * | 2/1993 | Dayan et al. ................... 713/2 |
| 5,230,052 A * | 7/1993 | Dayan et al. ................... 713/2 |
| 5,371,876 A | 12/1994 | Ewertz et al. |
| 5,579,522 A | 11/1996 | Christeson et al. |
| 5,671,413 A | 9/1997 | Shipman et al. |
| 5,737,765 A * | 4/1998 | Shigeeda ................... 711/170 |
| 5,748,912 A * | 5/1998 | Lee ............................ 710/301 |
| 5,822,581 A | 10/1998 | Christeson |
| 5,854,937 A * | 12/1998 | Woodward ..................... 712/1 |
| 6,003,100 A * | 12/1999 | Lee ............................ 710/301 |
| 6,122,733 A | 9/2000 | Christeson et al. |
| 6,128,732 A * | 10/2000 | Chaiken ....................... 713/2 |
| 6,282,644 B1 * | 8/2001 | Ko ................................ 713/2 |
| 6,393,561 B1 * | 5/2002 | Hagiwara et al. ............. 713/100 |
| 6,421,776 B1 * | 7/2002 | Hillis et al. ..................... 713/2 |
| 6,633,976 B1 * | 10/2003 | Stevens ........................ 713/2 |
| 6,697,287 B2 * | 2/2004 | Furukawa .............. 365/189.05 |
| 6,982,702 B1 * | 1/2006 | Frame ......................... 345/168 |
| 7,010,719 B2 * | 3/2006 | Nobuyoshi et al. ............. 714/6 |
| 7,013,385 B2 * | 3/2006 | Abbondanzio et al. ......... 713/2 |
| 2003/0058681 A1 | 3/2003 | Coulson |
| 2003/0103370 A1 | 6/2003 | Chow |
| 2003/0188123 A1 | 10/2003 | Royer et al. |

OTHER PUBLICATIONS

Lai, Stefan, Intel's Investigation of Next-Generation Memory Technologies for Portable Devices, Jul. 2001.*
Stikeman, Alexandra, Polymer Memory, Sep. 2002, Technology Review, p. 31.*
Spooner, John G., Intel attempts giant boost in handheld memory, Jul. 11, 2001, CNET News.com.*
International Search Report and Written Opinion for PCT/US2004/039481 mailed Mar. 20, 2006.
Dipert et al—Designing an Updatable Bios Using Glash Memory—Microprocess—vol. 16, No. 8, Jan. 1992—pp. 427-446.

* cited by examiner

*Primary Examiner*—Nitin C Patel
(74) *Attorney, Agent, or Firm*—Trop, Pruner & Hu, P.C.

(57) ABSTRACT

Briefly, in accordance with an embodiment of the invention, an apparatus and method to store initialization and configuration information is provided. The method may include storing basic input/output system (BIOS) software in a polymer memory. The method may further include copying a first portion of the BIOS software from the polymer memory to a random access memory (RAM) buffer of a memory controller, wherein the RAM buffer has a storage capacity of at least about two kilobytes (KB).

12 Claims, 5 Drawing Sheets

METHOD AND APPARATUS TO STORE INITIALIZATION AND CONFIGURATION INFORMATION

BACKGROUND

In some computing systems, the basic input/output system (BIOS) software may be stored in a flash electrically erasable programmable read-only memory (EEPROM). Flash memory is a relatively expensive memory, and because of this, the amount of memory available for the BIOS software is typically relatively small. Accordingly, due to the space constraint, some existing BIOS software may be limited in terms of its features and functionality.

Thus, there is a continuing need for alternate ways to store BIOS software in a computing system.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

In the following description and claims, the terms "include" and "comprise," along with their derivatives, may be used, and are intended to be treated as synonyms for each other. In addition, in the following description and claims, the terms "coupled" and "connected," along with their derivatives may be used, and these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. In addition, in the following description and claims, the term "information" may be used to refer to data, instructions, or code.

Figure 1:
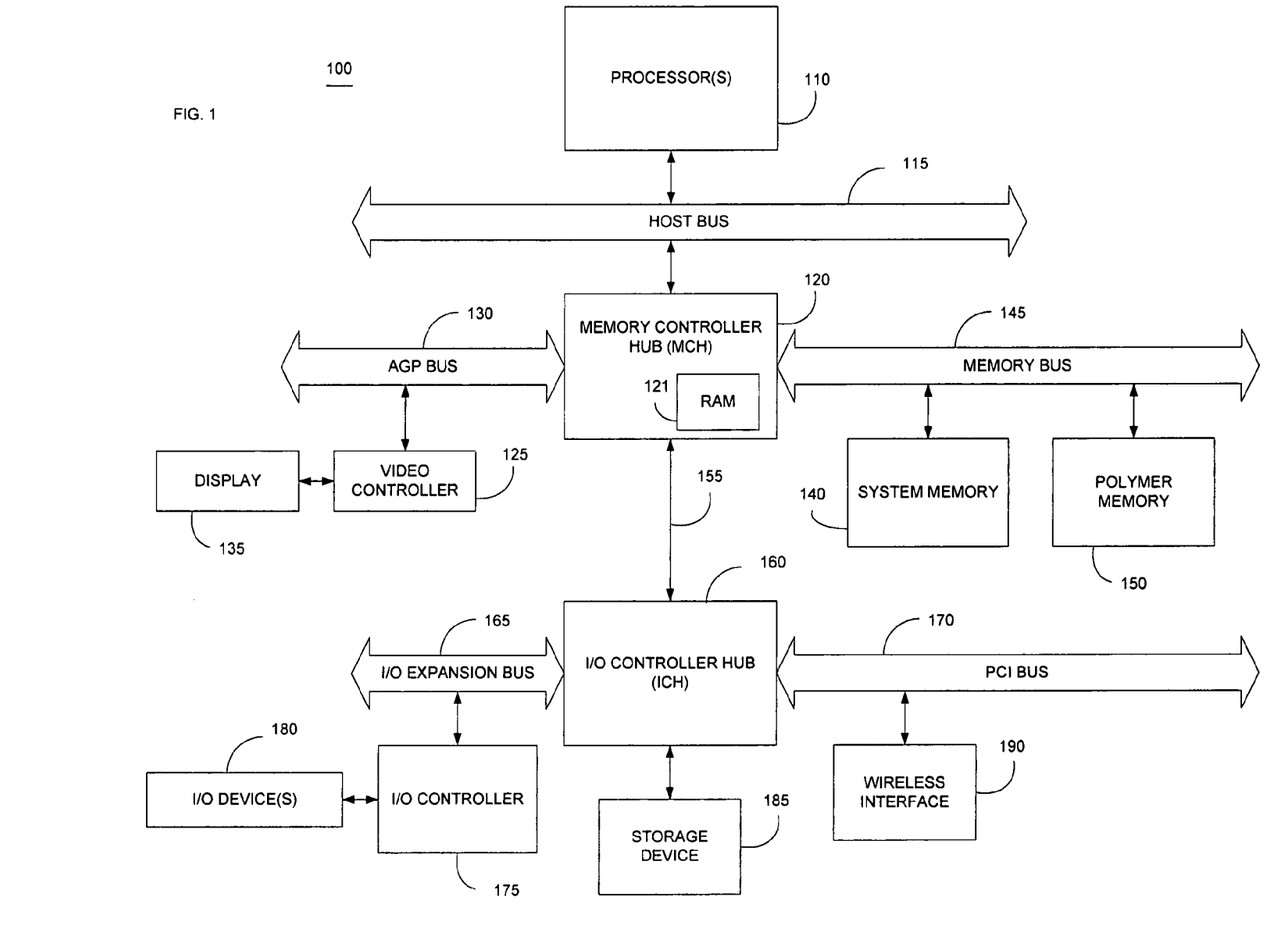
FIG. 1 is a block diagram illustrating a computing system in accordance with an embodiment of the present invention.

FIG. 1 is a block diagram illustrating a computing system 100 in accordance with an embodiment of the present invention. In this embodiment, computing system 100 may include a processor 110, which may include one or more general-purpose or special-purpose processors such as a microprocessor, microcontroller, application specific integrated circuit (ASIC), a programmable gate array (PGA), a digital signal processor (DSP), or the like. Computing system 100 may also be referred to as a computer or data processing system in some embodiments.

Processor 110 may be coupled to a host bus 115. A memory controller hub (MCH) 120, which may be referred to as a memory controller, may also be coupled to host bus 115. A video controller 125 may be coupled to MCH 120 via an Advanced Graphics Port (AGP) bus 130. Video controller 125 may be coupled to a display 135, which may be a cathode ray tube (CRT) display or a liquid crystal display (LCD). The AGP bus 130 may conform to the Accelerated Graphics Port Interface Specification, Revision 2.0, published May 4, 1998, by Intel Corporation, Santa Clara, Calif.

A system memory 140 may be coupled to MCH 120 via a memory bus 145. In addition, a polymer memory 150 may be coupled to MCH 120 via memory bus 145. Although the scope of the present invention is not limited in this respect, system memory 140 may be a relatively fast volatile memory such as, e.g., a static random access memory (SRAM), a dynamic random access memory (DRAM), or a synchronous DRAM (SDRAM).

In one embodiment, polymer memory 150 may be a non-volatile ferroelectric polymer memory that may include an array of ferroelectric memory cells, wherein each cell may include a ferroelectric polymer material located between at least two conductive lines. The conductive lines may be referred to as address lines and may be used to apply an electric field across the ferroelectric polymer material to alter the polarization of the polymer material.

In this embodiment, polymer memory 150 may utilize the ferroelectric behavior of certain materials to retain data in a memory device in the form of positive and negative polarization, even in the absence of electric power. The ferroelectric polarizable material of each cell may contain domains of similarly oriented electric dipoles that retain their orientation unless disturbed by some externally imposed electric force. The polarization of the material characterizes the extent to which these domains are aligned. The polarization can be reversed by the application of an electric field of sufficient strength and polarity. In various embodiments, the ferroelectric polymer material may comprise a polyvinyl fluoride, a polyethylene fluoride, a polyvinyl chloride, a polyethylene chloride, a polyacrylonitrile, a polyamide, copolymers thereof, or combinations thereof.

In an alternate embodiment, polymer memory 150 may be another type of plastic memory such as, for example, a resistive change polymer memory. In this embodiment, the plastic memory may include a thin film of non-volatile polymer memory material sandwiched at the nodes of an address matrix, e.g., a polymer memory material between two address lines. The resistance at any node may be altered from a few hundred ohms to several megohms by applying an electric potential across the polymer memory material to apply a positive or negative current through the polymer material to alter the resistance of the polymer material. Potentially different resistance levels may store several bits per cell and data density may be increased further by stacking layers.

MCH 120 may control the transfer of information within system 100, e.g., between processor 110, MCH 120, system memory 140, and polymer memory 150. That is, MCH 120 may generate control signals, address signals, and data signals that may be associated with write or read operations. MCH 120 may also include a volatile random access memory (RAM) buffer 121 that may be used to read information stored in polymer memory 150, as discussed below. For example, RAM buffer 121 may be used to buffer information read from polymer memory 150 and used to buffer information written to polymer memory 150.

MCH 120 may also be coupled, e.g., via a hub link 155, to an input/output controller hub (ICH) 160 that is coupled to a input/output (I/O) expansion bus 165 and a Peripheral Component Interconnect (PCI) bus 170, as defined by the PCI Local Bus Specification, Production Version, Revision 2.1 dated in June 1995, or alternately a bus such as the PCI Express bus, or another third generation I/O interconnect bus. The I/O expansion bus 165 may be coupled to an I/O controller 175 that controls access to one or more I/O devices 180. Examples of I/O devices 180 may include input devices, such as, e.g., a keyboard and/or mouse. In an alternate embodiment, the I/O controller 175 may be integrated into ICH 160, as may other control functions.

ICH 160 may also be coupled to a storage device 185. In one embodiment, polymer memory 150 may be a relatively large non-volatile disk cache memory adapted to cache information for storage device 185. Storage device 185 may be a mass storage device such as, for example, a disk memory having a storage capacity of at least about one gigabyte (GB). In various embodiments, storage device 185 may be an electromechanical hard disk memory, an optical disk memory, or a magnetic disk memory, although the scope of the present invention is not limited in this respect. In one embodiment, polymer memory 150 may have a storage capacity of at least about 100 megabytes. For example, polymer memory 150 may have a storage capacity of about 500 megabytes (MB). Polymer memory may be block addressable/accessible, although the scope of the present invention is not limited in this respect.

PCI bus 170 may be coupled to various components including, for example, a wireless interface 190, which may be used in certain embodiments to communicate with remote devices. Although not shown in FIG. 1, wireless interface 190 may include, or be coupled to, a dipole or other antenna, along with other components such as, e.g., a wireless transceiver. In various embodiments, wireless interface 190 may be coupled to system 100 via an external add-in card, or an embedded device. In other embodiments wireless interface 190 may be fully integrated into a chipset of system 100.

Although the description makes reference to specific components of the system 100, it is contemplated that numerous modifications and variations of the described and illustrated embodiments may be possible. Computing system may be a portable personal computer (PC) such as, e.g., a notebook or laptop computer capable of wirelessly transmitting information. However, it is to be understood that embodiments of the present invention may be implemented in another wireless device such as, e.g., a cellular phone, a wireless personal digital assistant (PDA) or the like. In such embodiments, a polymer memory in accordance with an embodiment may be coupled to an internal bus which is in turn coupled to a microprocessor and a peripheral bus, which may in turn be coupled to a wireless interface and an associated antenna such as a dipole antenna, helical antenna, global system for mobile communication (GSM) antenna, and the like.

It should also be noted that polymer memory 150 in accordance with another embodiment of the present invention, may also be implemented in non-wireless devices such as, for example, a desktop PC, server, or workstation that is not configured for wireless communication.

Figure 2:
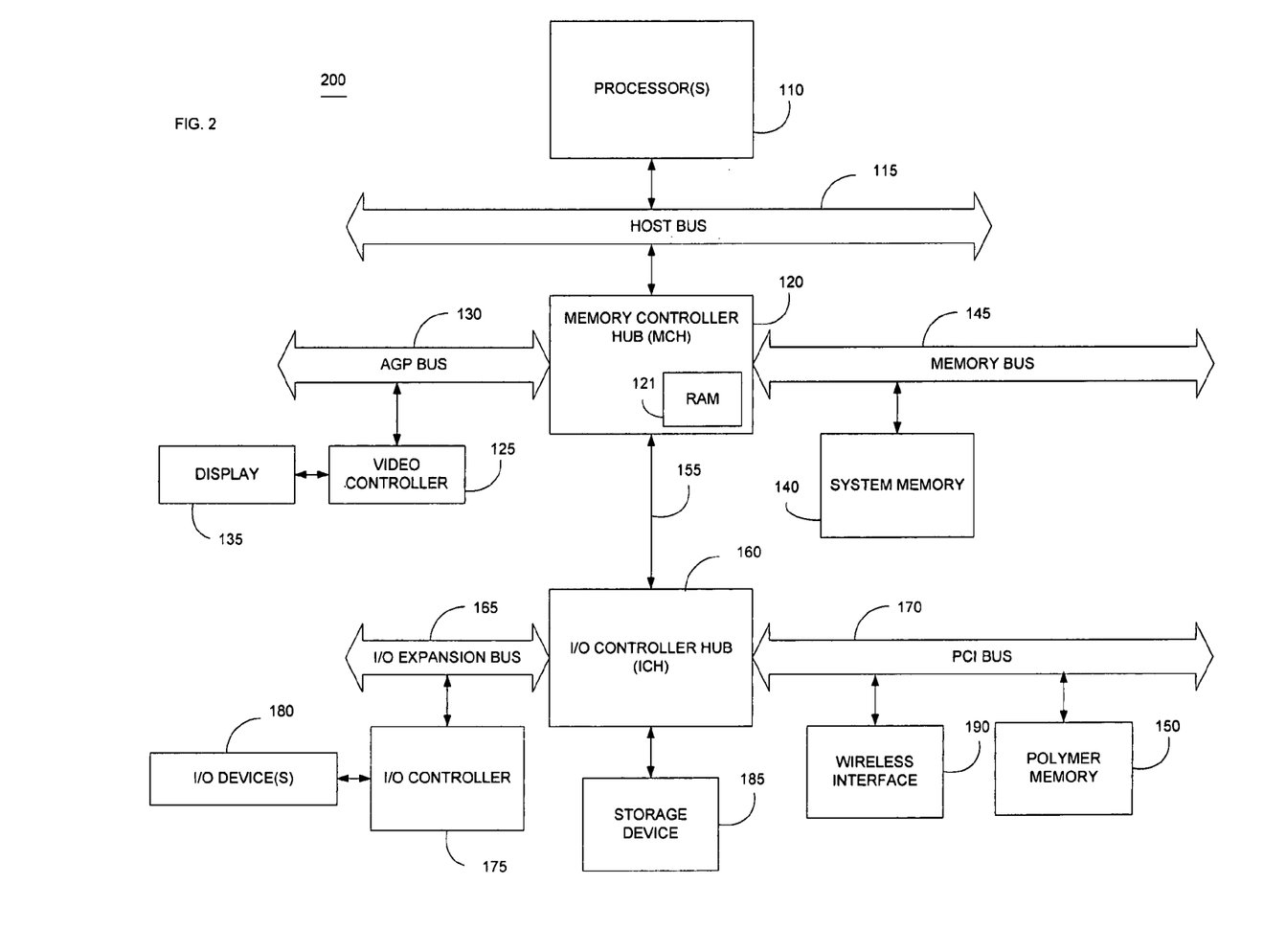
FIG. 2 is a block diagram illustrating a computing system in accordance with another embodiment of the present invention.

FIG. 2 is a block diagram illustrating a computing system 200 in accordance with another embodiment of the present invention. In this embodiment, polymer memory 150 may be implemented using a PCI add-in card coupled to PCI bus 170.

In addition, in an alternate embodiment of computing system 200 that is not shown in the figures, polymer memory 150 may include an integrated polymer memory controller which may include RAM buffer 121 integrated with polymer memory 150. This polymer memory controller may include interface and decode logic that operates as discussed below with reference to FIG. 5.

Figure 3:
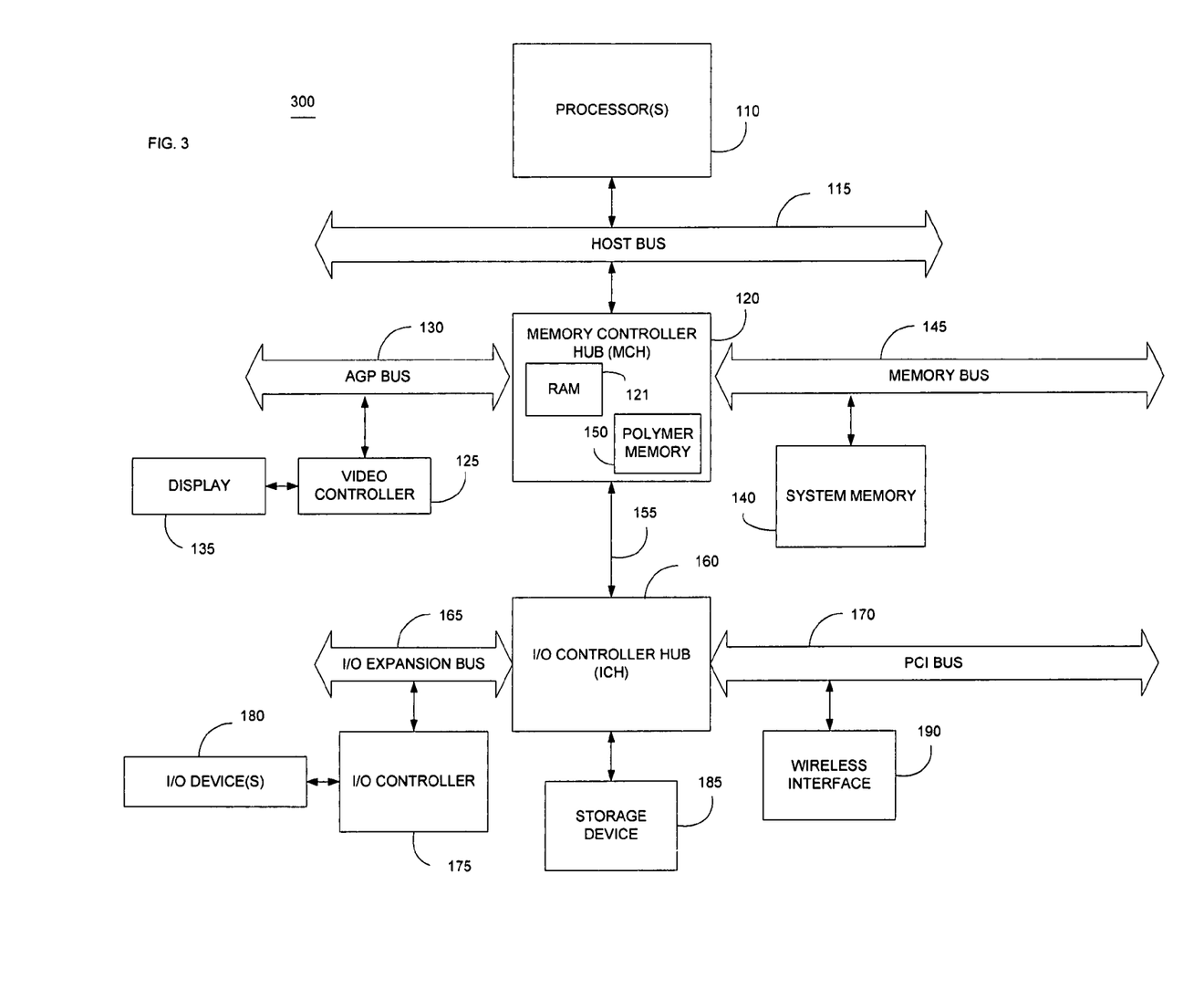
FIG. 3 is a block diagram illustrating a computing system in accordance with another embodiment of the present invention.

FIG. 3 is a block diagram illustrating a computing system 300 in accordance with another embodiment of the present invention. In this embodiment, polymer memory 150 may be integrated into a chipset of system 300, e.g., polymer memory 150 may be integrated with MCH 120.

Figure 4:
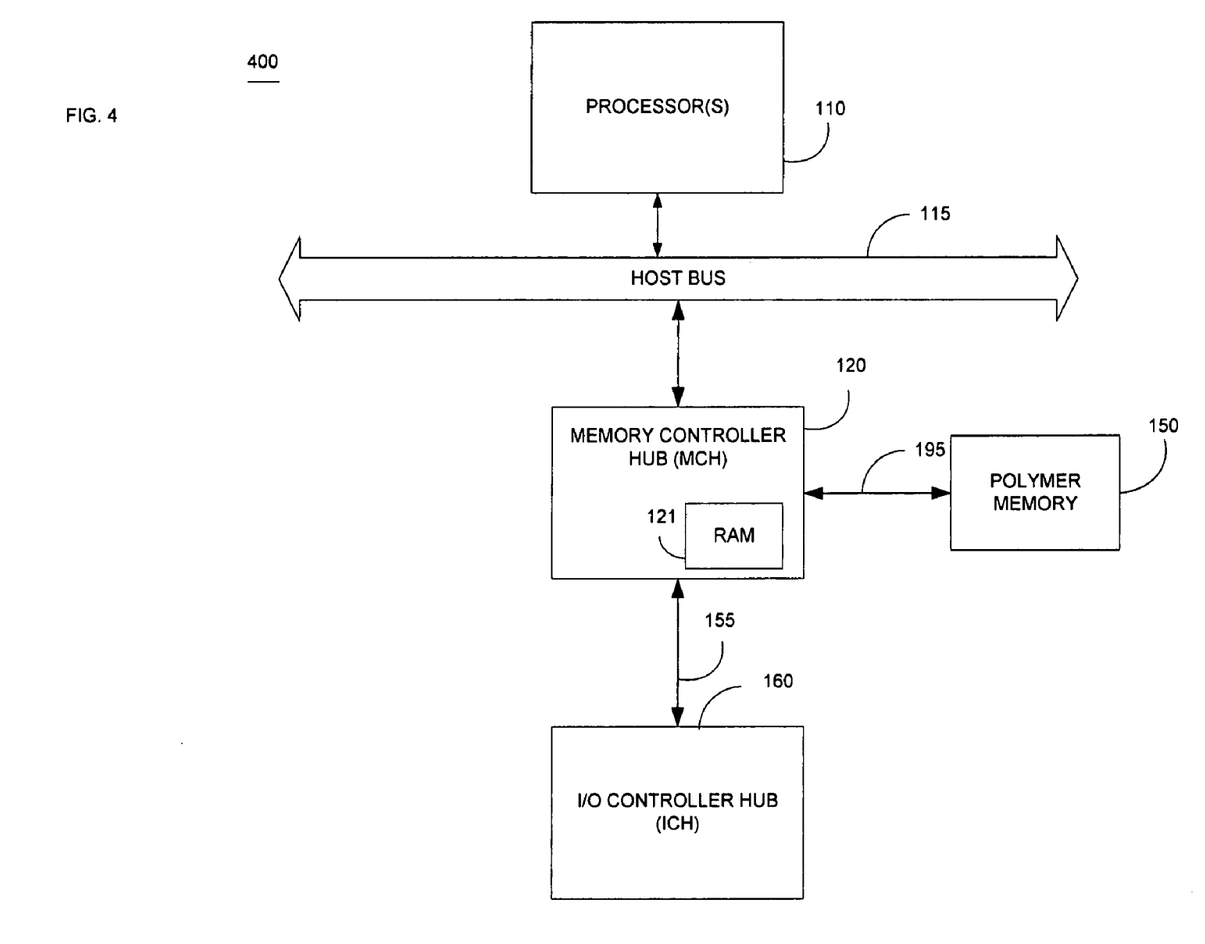
FIG. 4 is a block diagram illustrating a computing system in accordance with another embodiment of the present invention.

FIG. 4 is a block diagram illustrating a computing system 400 in accordance with another embodiment of the present invention. In this embodiment, polymer memory 150 may be integrated on a motherboard with other components of system 400 or may be an add-in card. In addition, polymer memory 150 may be coupled to MCH 120 via a PCI-Express link 195. PCI-Express link 195 may be a point-to-point link between components in system 400. In an alternate embodiment (not shown), polymer memory 150 may be coupled to ICH 160 via a PCI-Express link. For simplicity, all components of system 400 have not been shown in FIG. 4.

In various embodiments, in addition to being used as a disk cache, polymer memory 150 may also store firmware or boot information such as, for example, basic input/output system (BIOS) software. Firmware may refer to software or programs that are contained permanently in a hardware device.

In the embodiment wherein polymer memory 150 is a block addressable memory, MCH 120 may include decode and/or interface logic that may allow systems 100, 200, 300, or 400 to retrieve and execute BIOS software stored at either an arbitrary or fixed location in polymer memory 150. The BIOS software may be retrieved from polymer memory 150 and may be executed by processor 110 in response to a power-on/start-up or reset event.

In some computing systems, a reset address may be predefined. For example, in a 32-bit processing system having about four gigabytes of address space, the reset address may be 0XFFFFFFF0. MCH 120 may include interface logic or circuitry that may allow a computing system to retrieve and execute BIOS software stored in polymer memory 150 in response to a reset or power-on event.

Figure 5:
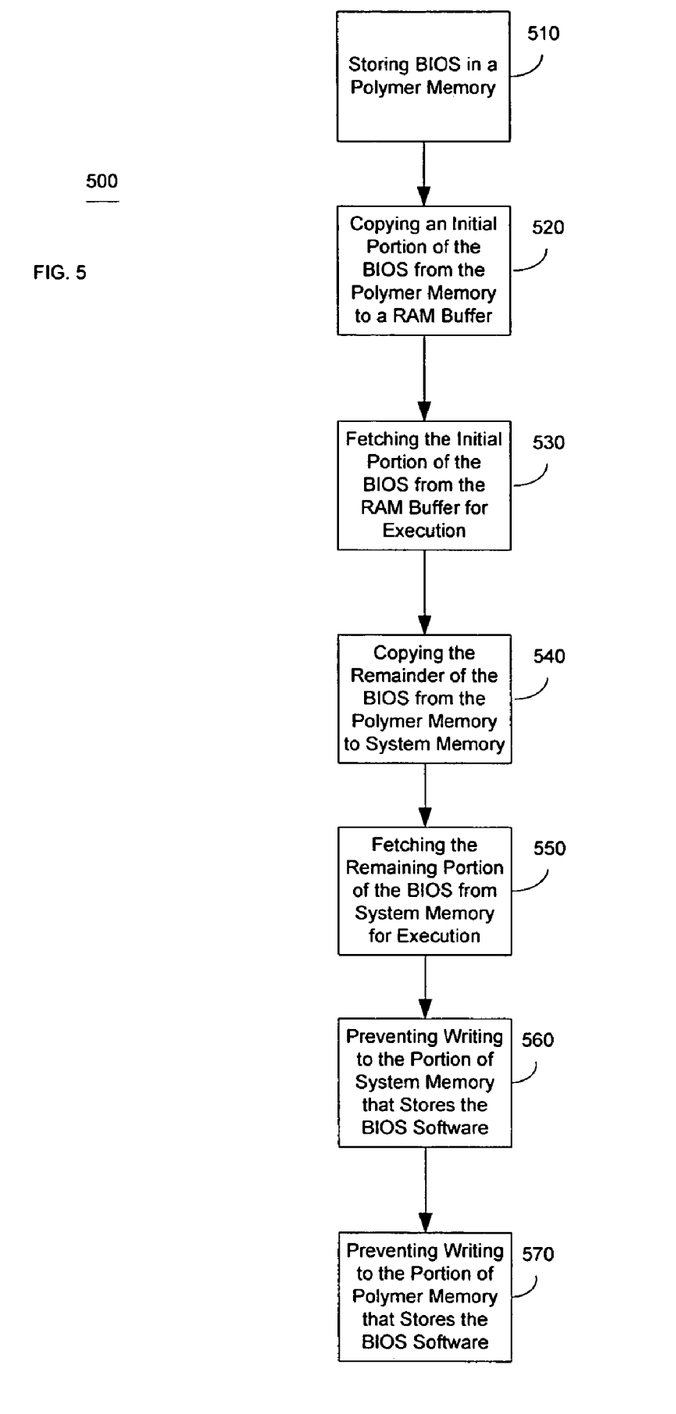
FIG. 5 is a flow diagram illustrating a method to store and execute BIOS software in accordance with an embodiment of the present invention.

Turning to FIG. 5, what is shown is a flow diagram illustrating a method 500 to store and execute BIOS software in accordance with an embodiment of the present invention. Method 500 will be described with reference to computing system 100 of FIG. 1. However, as may be appreciated, method 500 may also be implemented using computing systems 200, 300, or 400.

Method 500 may begin with storing basic input/output system (BIOS) software in polymer memory 150 (block 510). The BIOS software may include operating system (O/S) independent, motherboard specific system initialization code that may be executed on system power-up or in response to a reset event, and may initiate loading of the O/S. The BIOS software may include code to do one or all of the following: check the complementary metal oxide semiconductor (CMOS) setup or configuration information; load the interrupt handlers and device drivers; initialize registers and power management; perform the power-on self-test (POST) to verify to that the computing system's components are operational; display system settings; determine which devices are bootable; initiate the bootstrap sequence.

In response to a power-on or reset of system 100, MCH 120 may include logic to copy the initial block(s) of the BIOS software from polymer memory 150 to RAM buffer 121 (block 520). In one embodiment, RAM buffer 121 may be an eight kilobyte (KB) buffer integrated with MCH 120, although the scope of the present invention is not limited in this respect. Smaller or larger size RAM buffers may also be used for RAM buffer 121. For example, RAM buffer 121 may range in size from about 512 bytes to about 64 KB in different applications, although the scope of the present invention is not limited in this respect. RAM buffer 121 may also have a relatively faster access time compared to polymer memory 150, and may be located in a polymer memory controller that may be part of a chipset of system 100 or may be integrated with polymer memory 150.

After the initial portion of the BIOS software is copied to RAM buffer 121, processor 110 may fetch and execute the initial portion of the BIOS software from RAM buffer 121 (block 530). The initial portion of the BIOS may include POST operations to enable processor 110 to subsequently access system memory 140. The initial portion of the BIOS may also include code to copy the remaining portion of the BIOS from polymer memory 150 to system memory 140. In an alternate embodiment, all or part of the initial portion of the BIOS may be copied to system memory 140 and executed from memory 140.

Next, the initial BIOS software may copy the remainder of the BIOS image from polymer memory 150 into system memory 140 (block 540), and continue execution of the remainder of the BIOS software from system memory 140. That is, after the remaining portion of the BIOS software is copied to system memory 140, processor 110 may fetch and execute the remaining portion of the BIOS software from system memory 140 (block 550).

Generally, the polymer memory controller (e.g., MCH 120) may provide a protection function to prevent overwriting of the BIOS software. In this embodiment, during execution of the BIOS software, the copy of the BIOS image in system memory 140 may be protected to prevent overwriting of the BIOS software (block 560). For example, MCH 120 may include inhibit logic to prevent write access to system memory 140 during the execution of the BIOS code. In addition, MCH 120 may include protection logic that may prevent accidental or intentional overwriting of the BIOS image stored in polymer memory 150 (block 570). For example, "write once" or "reset clear" protection operations may be used. In addition, polymer memory 150 may itself include a "block lock" feature to prevent memory accesses (e.g., reading, writing, or erasing) of one or more segments or regions of polymer memory 150. In one example, the BIOS software may be stored in a specific block or sector of polymer memory 150, and polymer memory and/or MCH 120 may include a block lock circuit to prevent writing to this block of polymer memory 150.

In another embodiment, system 100 may be configured to not allow the BIOS image to completely be overwritten as this may make it difficult to update the BIOS. Instead, the BIOS may be overwritten only in controlled circumstances. For example, one method may include updating the BIOS via a chipset feature that allows a portion of polymer memory 150 that stores the BIOS to only be writable when in SMM, thereby allowing BIOS SMM code to validate any writes to polymer memory 150. Another example may include to lock down the appropriate blocks in the firmware hub itself. Unlocking these blocks to make them writable may require a firmware hub reset, which can be done with a processor INIT if the board is designed to support this. The BIOS update may be copied into memory prior to the INIT, and then validated and executed following the processor init. The INIT does not reset the chipset so the memory contents persist.

In an alternate embodiment, polymer memory 150 may have a separate memory controller from system memory 140. The memory controller of polymer memory 150 may be referred to as a polymer memory controller that may include a RAM buffer similar to RAM buffer 121 discussed above.

In some systems, the initialization process may be referred to as the initial program load (IPL). In such systems, polymer memory 150 may store the initial program load (IPL) information.

In addition to storing BIOS software, in other embodiments, polymer memory 150 may store other initialization or configuration information of system 100. For example, polymer memory 150 may store option read only memory (ROM) code, CMOS configuration information, or extended system configuration data (ESCD). Information such as CMOS, option ROM, or ESCD information may be referred to as boot information, although this list may not be comprehensive of all boot information. Other information not listed here may also be considered to be boot information.

Configuration information may generally refer to the specific hardware and software details in terms of devices attached, capacity or capability, and what the system is made up of. CMOS configuration information may refer to the configuration information that may be stored in a relatively small, e.g., 64 bytes, of CMOS RAM. Examples of CMOS configuration information may include user options or preferences, boot sequence information, and information about the type of devices included in the system such as, e.g., floppy drives, hard disk, keyboard, mouse, display, etc. If system 100 is adapted to support plug and play (PnP), then the BIOS software may also read the ESCD for configuration information on existing PnP devices.

In addition, other general purpose non-volatile information may also be stored in polymer memory 150. For example, EFI variables may be stored in polymer memory 150. EFI may refer to the Extensible Firmware Interface (EFI) specification, version 1.10, published Dec. 1, 2002, by Intel Corporation, Santa Clara, Calif.

Method 500 may allow the BIOS software to be stored in non-volatile polymer memory 150 and accessed using a predefined reset address from RAM buffer 121 and/or system memory 140, wherein both buffer 121 and memory 140 may have relatively faster access times compared to polymer memory 150.

Method 500 may allow computing systems such as computing systems 100, 200, 300, or 400, that include a polymer memory and not a flash EEPROM, to be "backward compatible." For example, as discussed above, in one embodiment BIOS software may be stored in a polymer memory and not a flash EEPROM, and the memory controller coupled to the polymer memory may include a relatively small RAM buffer to enable booting a computing system using boot information stored in the polymer memory.

Some computing systems that store BIOS in a flash EEPROM may use a "page" technique to allow access to a larger BIOS area than can be directly addressable in the address range allowed for BIOS. In such a case, if the portions of the BIOS code/data that need to be accessed for some function are not currently addressable, the BIOS may control the mapping of the address ranges of the flash memory device to make other portions addressable. MCH 120 may be modified to map and copy portions of the BIOS polymer memory 150 into a "BIOSpagable" system memory area so that a similar "page" BIOS operation may be implemented in a system that stores BIOS code in a polymer memory.

In various embodiments, computing systems 100 to 400 may be adapted to allow a field upgradable "boot loader" to rewrite the BIOS image in polymer memory 150. In another embodiment, to allow arbitrary portions of polymer memory 150 to be used to hold the BIOS image, some non-volatile (NV) configuration data may be stored in either memory controller 120 or in known, fixed locations of polymer memory 150 that describe where memory controller 120 may find the current BIOS image.

The embodiments discussed above provide methods, apparatuses, and systems to store and execute BIOS software. In the embodiment illustrated in FIG. 2, wherein polymer memory 150 may be implemented as an add-in card coupled to PCI bus 170, the system boot times may be longer compared to the embodiment illustrated in FIG. 3 since code or data fetches from polymer memory 150 in system 200 may have to traverse more bus interfaces. Including polymer memory 150 on the motherboard (e.g., as illustrated in FIGS. 1 and 3) or integrated into a chipset like MCH 120 (e.g., as illustrated in FIG. 3), may reduce system boot times.

In another embodiment of the present invention, a method includes storing initialization or configuration information of a computing system (e.g., systems 100, 200, 300, 400) in a polymer memory (e.g., polymer memory 150). The initialization information may include BIOS information. The configuration information may include boot sequence information and/or Extended System Configuration Data (ESCD).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
storing basic input/output system (BIOS) software in a polymer memory, wherein the polymer memory is coupled to a memory controller via a memory bus;
copying a first portion of the BIOS software from the polymer memory to a random access memory (RAM) buffer within a memory controller via the memory bus; and
copying a second portion of the BIOS software from the polymer memory to system memory for execution.

2. The method of claim 1, wherein the RAM buffer has a storage capacity of at least about 512 bytes.

3. The method of claim 2, wherein copying a first portion of the BIOS software from the polymer memory occurs in response to a power-on or reset of a system that includes the polymer memory and wherein the first portion of the BIOS software includes power on self test (POST) code and code to copy a second portion of the BIOS software from the polymer memory to a volatile system memory.

4. The method of claim 1, further comprising preventing writing to the system memory during execution of the BIOS software.

5. The method of claim 1, wherein the BIOS software is stored in a first portion of the polymer memory and wherein the method further comprises preventing writing to the first portion of the polymer memory.

6. The method of claim 1, wherein the polymer memory has a storage capacity of at least about 100 megabytes and the polymer memory is a disk cache that caches information for a disk memory having a storage capacity of at least about one gigabyte.

7. A method, comprising:
storing basic input/output system (BIOS) software in a ferroelectric memory, wherein the ferroelectric memory is coupled to a memory controller via a memory bus;
copying a first portion of the BIOS software from the ferroelectric memory to a random access memory (RAM) buffer within a memory controller via the memory bus; and
copying a second portion of the BIOS software from the ferroelectric memory to system memory for execution.

8. The method of claim 7, wherein the ferroelectric memory is a polymer memory.

9. The method of claim 7, wherein the BIOS software is stored in a first portion of the ferroelectric memory and further comprising preventing writing to the first portion of the ferroelectric electric memory.

10. A method, comprising:
storing basic input/output system (BIOS) software in a resistive change memory, wherein the resistive change memory is coupled to a memory controller via a memory bus;
copying a first portion of the BIOS software from the resistive change memory to a random access memory (RAM) buffer within a memory controller via the memory bus; and
copying a second portion of the BIOS software from the resistive change memory to system memory for execution.

11. The method of claim 10, wherein the resistive change memory is a polymer memory.

12. The method of claim 10, wherein the BIOS software is stored in a first portion of the resistive change memory and further comprising preventing writing to the first portion of the resistive change memory.

* * * * *

UNITED STATES PATENT AND TRADEMARK OFFICE
CERTIFICATE OF CORRECTION

PATENT NO. : 7,424,603 B2
APPLICATION NO. : 10/742386
DATED : September 9, 2008
INVENTOR(S) : Kirk D. Brannock et al.

It is certified that error appears in the above-identified patent and that said Letters Patent is hereby corrected as shown below:

Column 8:
Line 35, "ferroelectric electric" should be --ferroelectric--.

Signed and Sealed this

Sixteenth Day of December, 2008

JON W. DUDAS
*Director of the United States Patent and Trademark Office*